United States Patent [19]

Nissel

[11] Patent Number: 5,466,403
[45] Date of Patent: Nov. 14, 1995

[54] APPARATUS AND METHOD FOR EXTRUDING AND COOLING A POLYMERIC SHEET

[75] Inventor: Frank R. Nissel, Ambler, Pa.

[73] Assignee: Welex Incorporated, Blue Bell, Pa.

[21] Appl. No.: 251,573

[22] Filed: May 31, 1994

[51] Int. Cl.[6] .......................... B29C 47/16; B29C 47/88
[52] U.S. Cl. .................. 264/39; 264/40.5; 264/175; 264/210.2; 264/237; 425/327; 425/363; 425/367
[58] Field of Search .................. 264/175, 210.2, 264/40.5, 40.7, 39, 237; 425/327, 363, 367, 188, 190, 382.3

[56] References Cited

U.S. PATENT DOCUMENTS

| | | | |
|---|---|---|---|
| 3,826,602 | 7/1974 | Shaffer et al. | 425/378.1 |
| 3,918,865 | 11/1975 | Nissel | 264/171 |
| 4,000,230 | 12/1976 | Brendel et al. | 264/171 |
| 4,140,463 | 2/1979 | Brinkmann et al. | 425/378.1 |
| 4,368,016 | 1/1983 | Zoller | 425/378.1 |
| 4,874,571 | 10/1989 | Müller | 264/175 |
| 4,997,358 | 3/1991 | Perkins et al. | 425/363 |
| 5,211,898 | 5/1993 | Shinmoto | 264/171 |

FOREIGN PATENT DOCUMENTS 61-92817  5/1986  Japan ........................ 264/175

*Primary Examiner*—Jeffery R. Thurlow
*Attorney, Agent, or Firm*—Austin R. Miller

[57] ABSTRACT

Apparatus for extruding and cooling a polymeric sheet incorporating an extruder connected to feed polymer through a rigid conduit and to and through a sheet die, and a roll stack including a plurality of cooling rolls having nips arranged adjacent the sheet die to continuously receive and cool polymeric sheet emanating from said die. Polymeric sheet feed control apparatus for tilting the stack to arrange the roll nips at various angles between and including the vertical and the horizontal, a pair of spaced-apart swivels positioned between the extruder and the sheet die, one swivel being connected to permit independent swinging movement of the sheet die up and down, and another swivel being connected to permit independent tilting movement of the sheet die angularly up and down to relate the tilt of the sheet die to the tilt of the stack.

18 Claims, 4 Drawing Sheets

APPARATUS AND METHOD FOR EXTRUDING AND COOLING A POLYMERIC SHEET

BACKGROUND OF THE INVENTION

This invention relates to an apparatus and method for extruding and cooling a polymeric sheet, and particularly relates to an extruding and cooling method in which the cooling of the polymeric sheet is conducted by passing the sheet between successive nips in a plurality of cooling rolls arranged as a unit to process the sheet through successive nips, such arrangement of cooling rolls being generically referred to herein as a roll stack.

THE PRIOR ART

Plastic sheet is usually extruded out of a slit die of appropriate width and is then cooled by passing the sheet through a series of temperature controlled rolls. Though various numbers and arrangements may be used, the rolls are usually three in number. The gaps between them are precisely adjusted to the desired sheet thickness. This is to eliminate air entrapment between the rolls at the sheet which would adversely affect heat transfer for cooling. The rolls also apply a good surface impression on the sheet, of the type desired.

Traditionally, the die exit is horizontal and the sheet runs through a vertical roll stack either upwardly (upstack) or downwardly (downstack). There are advantages and disadvantages to both methods for specific products.

More recently, there has been a trend to use inclined or horizontal roll stacks for some applications. These arrangements reduce the tendency of the hot fluid sheet to droop between the die and the first roll nip. Droop undesirably causes cooling of the sheet surface prior to the pressure point created by the roll nip. Such cooling tends to solidify the surface prematurely so that it will no longer take a perfect roll surface impression. It also tends to entrap air between the roll and the sheet, causing non-uniform cooling and further surface defects.

There are various advantages and disadvantages of particular roll positions for specific products, so that there is no single arrangement ideally suited for all applications.

In producing very thin sheet products with the use of pressure rolls, it is difficult to obtain sufficient roll dimensional accuracy in order to produce uniform sheet. In such cases either a single roll is used or a series of separate rolls arranged with no pressure between them. The sheet is cast on the roll or rolls, using an air knife or a non-contact electrostatic pinning wire to keep the sheet in contact with the roll or rolls. In such a case, with the gear box of the extruder traditionally located at a fixed point, thermal expansion causes uncontrolled movement of the sheet die, disturbing the relationship between the sheet die lip and the roll on which the sheet is being deposited. It is important to overcome this disadvantage in order to produce a high quality, thin cast sheet.

Others have built roll stacks either in various fixed configurations or in adjustable configurations. The problem has been to make the die location and inclination suit the various arrangements. In the past the only solution was to build a variety of rigid adapters between the extruder and the die for specific configurations. These are difficult and costly to change. The machine must be shut down and major heavy components must be changed at high temperatures—or worse—cooled, changed and then reheated.

The polymer flow connection must be made of essentially rigid components to sustain the necessary pressures in the 2000–5000 psi range to be heatable to the 400°–600° F. temperatures necessary for maintaining polymer fluidity. This precludes the use of any known flexible tubes or hoses for most applications. The only flexible hoses known are either circumferentially corrugated high pressure metal tubes that cannot be uniformly heated or are limited to diameters too small to be practical for the necessary high flow rates and too weak to withstand the necessary pressures and temperatures.

OBJECTS OF THE INVENTION

It is accordingly an object of this invention to enable infinitely adjustable die positioning in elevation as well as in tilt or inclination, in order to conform the height and attitude of the die lip of a sheet die to the specific height and inclination of the central axis of the nip into which the molten extruded sheet is to be introduced.

Another object of this invention is to provide a method for attaining optimum cooling utilizing a roll stacked nip for continuously cooling a continuously extruded sheet from the outlet of a sheet die.

BRIEF DESCRIPTION OF THE INVENTION

The foregoing and other objects are achieved by providing, connected to an extruder connected to feed polymer through a rigid conduit to and through a sheet die, a pair of spaced apart swivels positioned between the extruder and the sheet die, one of the swivels being connected to permit independent movement of the sheet die up and down, and another such swivel being connected to permit independent angular tilting movement of the sheet die. This combination, together with a means for tilting the roll stack to arrange the roll nips at various angles between and including the vertical and the horizontal, provides a novel and highly advantageous means for relating the tilt of the sheet die to the tilt of the stack, thereby achieving optimum cooling of the continuously running sheet.

The objects of this invention are also achieved by providing a method for obtaining optimum cooling utilizing a roll stack nip for uniformly cooling a continuously extruded sheet from the outlet of the sheet die, by performing the steps of tilting the stack to the optimum nip roll angle for the particular sheet and conditions, changing the elevation and angle of tilt of the sheet die to conform to the tilt of the stack, and positioning the outlet of the sheet die immediately adjacent to the roll stack nip.

BRIEF DESCRIPTION OF THE DRAWINGS

The foregoing and other objects of the invention are achieved by the invention which will be described in particular detail hereafter, and in the drawings, of which.

DETAILED DESCRIPTION OF THE PREFERRED EMBODIMENT

Figure 1:
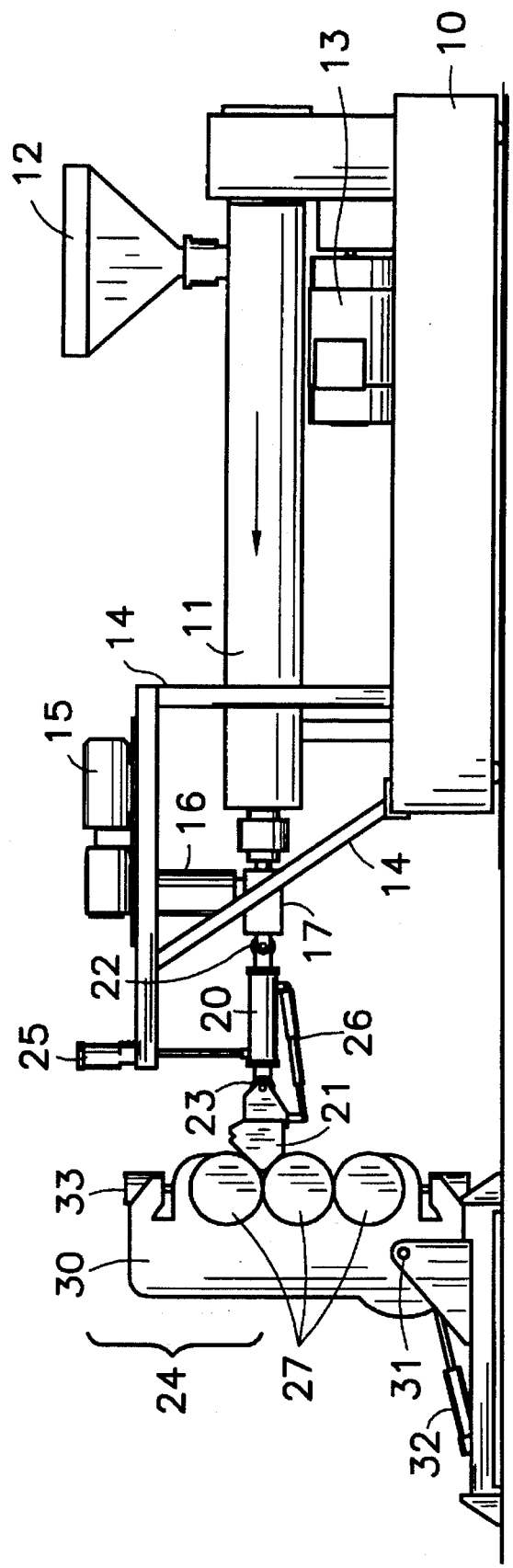
FIG. 1 is a preferred form of apparatus for extruding and cooling a polymeric sheet, utilizing features of this invention for performing a downstack.

The description which follows is directed to the specific forms of the invention selected for illustration in the drawings. It will be appreciated that various other embodiments may be used without departing from the spirit or scope of the invention.

Turning now to FIG. 1 of the drawings, the number 10 designates the base for a polymer extruder 11 having a feed hopper 12 and a drive motor 13. Extruders of this type illustrated are well known, and may be connected either for extruding a single monomeric material or for coextruding a plurality of layers into a common sheet, as shown in U.S. Pat. Nos. 3,918,865 and 3,940,221 to Frank R. Nissel, the disclosures of which are incorporated herein by reference.

The number 14 designates a framework connected to the base 10 and supporting a gear pump motor 15 connected to a universal joint 16 for introducing a polymer intended to be coextruded. The number 17 designates a gear pump for precision feeding of the coextrudate through a feed pipe 20 (which may optionally include a static mixer) and then to an extrusion die 21.

In accordance with this invention, it is important to provide a multiply pivotable linkage between the extruder 11 on the one hand and the die 21 on the other. This is achieved by the use of a connecting pipe provided with two or more elbow joints, as shown in FIG. 1. One such joint is a swivel or pivotal connection 22 positioned between the extruder and the sheet die, and being connected to permit independent swinging movement of the sheet die up and down. Another such swivel 23 is connected to permit independent tilting movement of the sheet die angularly up and down to relate the tilt of the sheet die with respect to the tilt of the nip of a roll stack 24, which is positioned immediately adjacent to the sheet die 21. As is illustrated in FIG. 1, movement of the feed pipe 20, which serves as a rigid conduit extending between the extruder and the sheet die, is power driven by a screw jack 25 connected pivotally to the feed pipe 20. Similarly, the screw jack 26 is connected to the sheet die 21 and to the frame 14 essentially at the upstream swivel 22. This provides independent swiveling at the points 22 and 23, so that one can pivot independently of the other and serves to power drive the independent angular tilting movement of the sheet die, causing a controllable tilting movement which is an important feature of this invention, and which movement is independent of the up and down movement activated by the screw jack 25.

As is shown in FIG. 1, the roll stack 24 selected for illustration comprises three parallel, aligned nip rolls 27, 27, 27, which are mounted on a common support 30 and which are tiltable as a group around the pivot 31, power driven by a screw jack 32. Appropriate pressure is optionally provided between the roll nips by a pressure cylinder 33.

It will accordingly be apparent that the roll stack 24 is capable of independent tilting movement about the pivot 31, all under control of the screw jack 32. It will also be apparent that the extrusion die 21 is capable of movement up and down under the influence of the screw jack 25, and of tilting movement under the influence of the screw jack 26.

Figure 2:
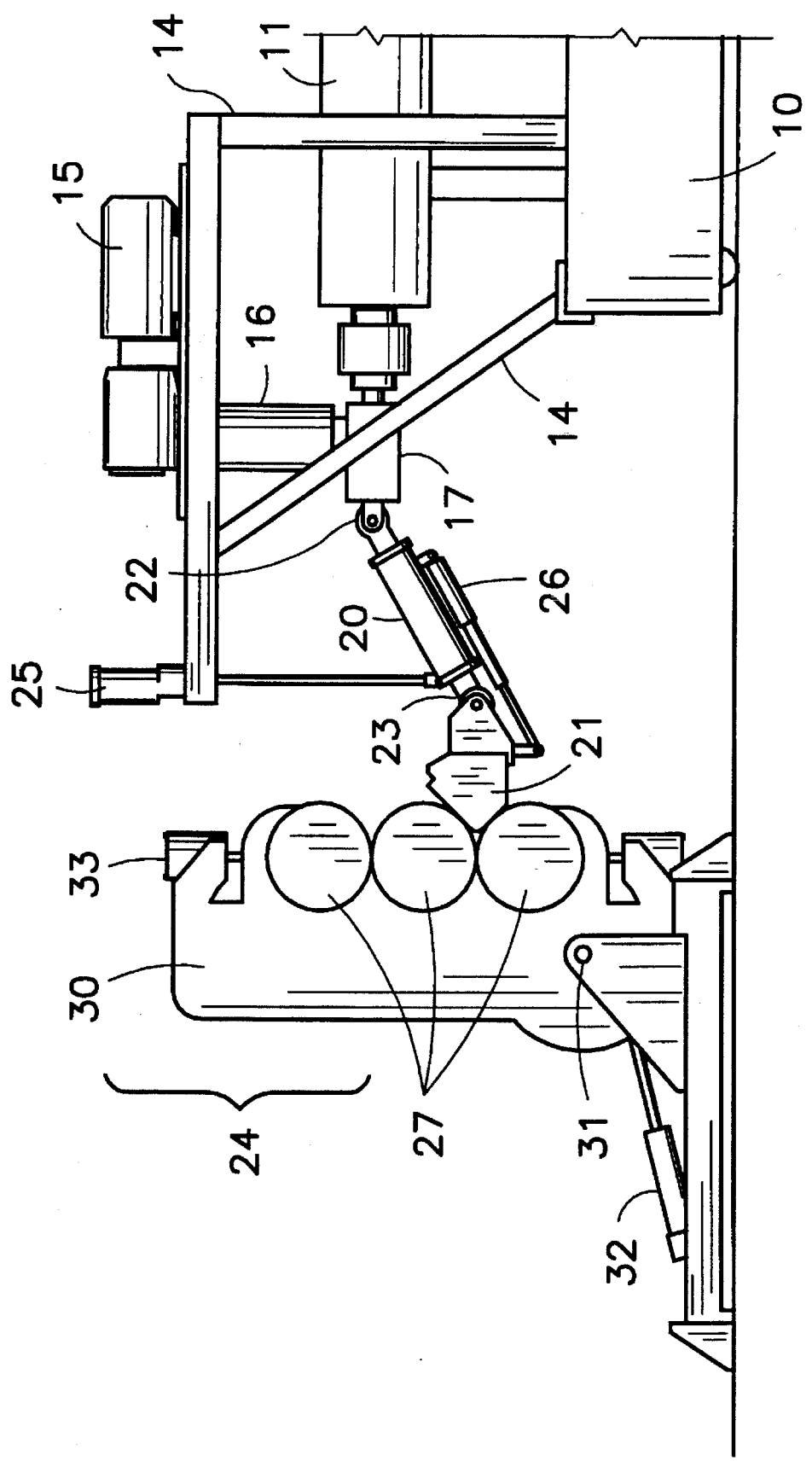
FIG. 2 is a view similar to the left-hand portion of FIG. 1, showing the relationship of parts for performing an upstack.

Turning now to FIG. 2 of the drawings, an upstack arrangement is illustrated wherein the molten continuous polymeric sheet is introduced into the nip between the lower two rolls 27, 27 and is caused to pass upwardly and through the nip between the two upper rolls 27, 27 for controlled cooling. The position and attitude of the extrusion die 21 may be precisely correlated to the position of the lower nip between the rolls 27, 27, this universal movement being permitted by the swivel joints 22 and 23, allowing precise control not only of the elevation but the attitude of the extrusion die 21 with respect to the nip between the two lowermost rolls 27, 27. Each selected position is controlled and maintained under power by the screw jacks 25 and 26.

Figure 3:
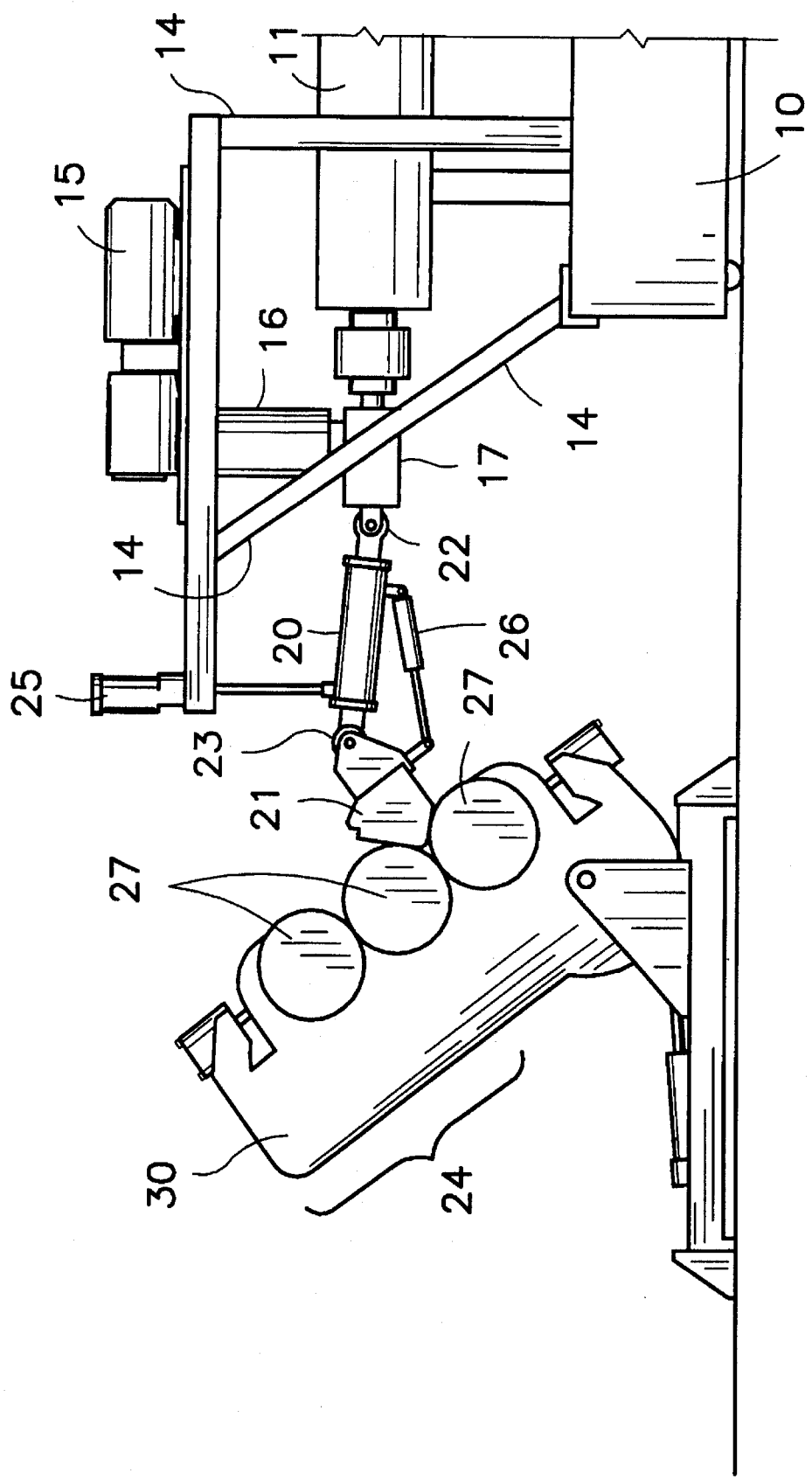
FIG. 3 is a view similar to FIG. 2, showing the roll stack in an inclined attitude.

Turning now to FIG. 3 of the drawings, an inclined orientation of the roll stack 24 is shown. Again, the extrusion die 21 is accurately correlated with the angle of tilt of the roll stack 24, for precise introduction of the molten polymeric sheet into the nip between the two lowermost rolls 27, 27. This precision correlation is brought about under the influence of the screw jacks 25, 26, which permit essentially universal swinging and tilting movement of the extrusion die 21.

Figure 4:
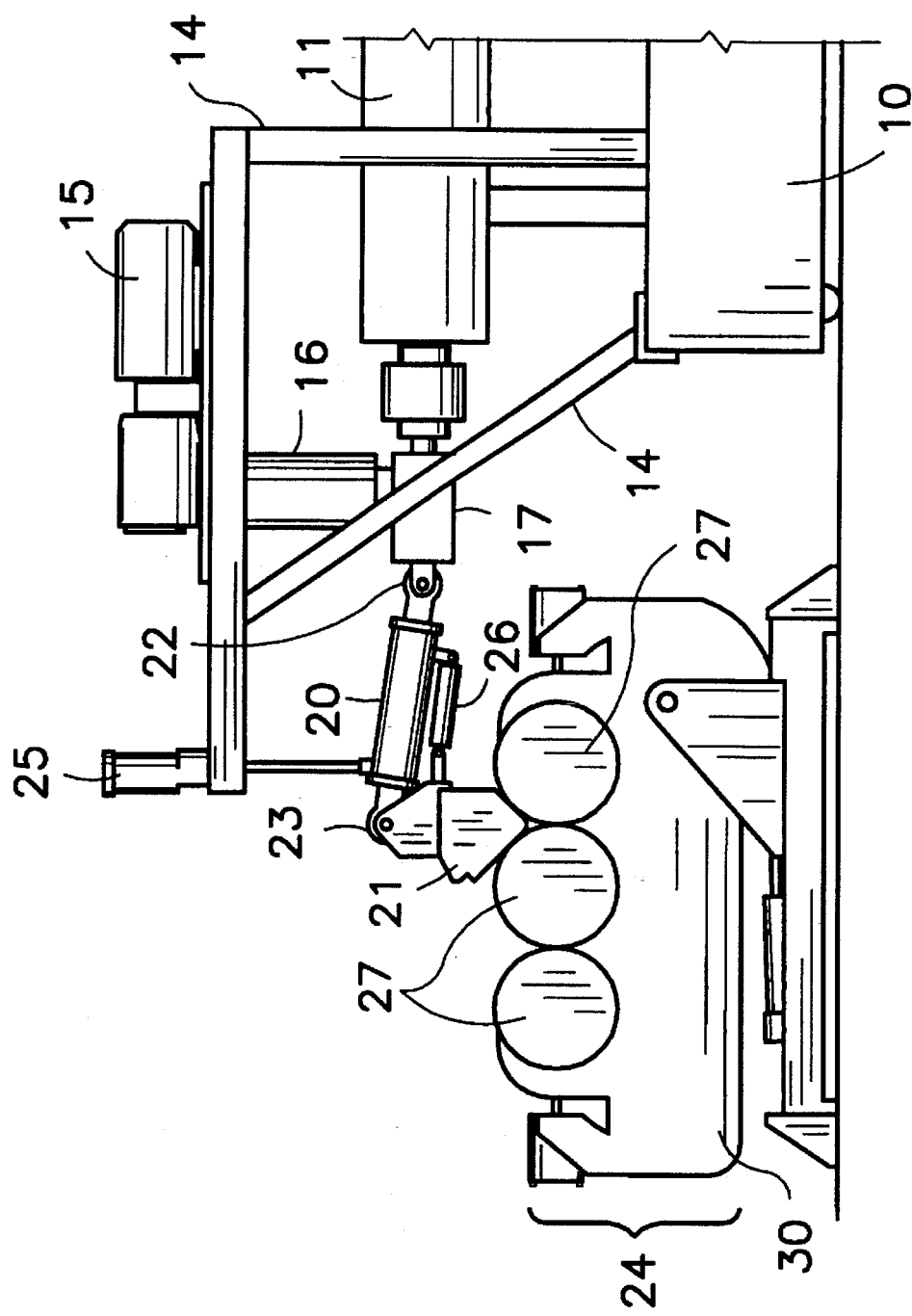
FIG. 4 is a view similar to FIG. 3, showing the roll stack in a substantially horizontal attitude.

FIG. 4 of the drawings shows the roll stack 24 in a substantially horizontal position, and shows the extrusion die 21 located in a precision location for continuous introduction of molten polymeric sheets into the near nip between the nip rolls 27, 27. Again, as power driven by the screw jacks 25, 26 and with the action of the swivel joints 22, 23, precision location of the extrusion die 21 in relation to the angle of inclination of the nip rolls 27 is achieved.

It will now be apparent that the extruder 11 is connected to feed polymer through a rigid conduit, here shown as including the static mixer 20 and the gear pump 17, to and through the sheet die 21, which is adjacent to a roll stack 24. The roll stack includes a plurality of cooling rolls 27, which may be of any number, having nips arranged adjacent to the sheet die 21 to continuously receive and cool the polymeric sheet emanating from the die. Polymeric sheet feed control apparatus is provided including the roll stack tilting means shown and described, for arranging the roll nips at various angles between and including the vertical and horizontal. Further, a pair of spaced-apart swivel connections 22 and 23 are positioned between the extruder and the sheet die, one of the swivels being connected to permit independent swinging movement of the sheet die up and down around the swivel as a pivot, and another of the swivels being connected to permit independent tilting movement of the sheet die to relate the tilt of the sheet die to the tilt of the roll stack. Further, power means are provided, here shown in the preferred form of screw jacks, for actuating movement of the sheet die independently upwardly and downwardly and in its tilting movement.

It will further be apparent that a method is shown for obtaining optimum cooling uniformity when using a roll stack nip for continuously cooling a continuously extruded sheet from the outlet of the sheet die. The method comprises the steps of tilting the roll stack to the optimum nip roll angle for the particular sheet and for the particular conditions encountered, changing the elevation and angle of tilt of the sheet die to conform to the tilt of the stack, and of the orientation of its nip, and positioning the outlet of the sheet die immediately adjacent to the nip and at the desired angle, preferably midway of the nip opening. These are important and advantageous features of the invention, as will now be readily apparent.

The swivels 22 and 23 are desirably in the form of specially designed elbow joints, designed with self-actuating seals to prevent leakage under the high pressure and high temperature conditions of the operation while permitting their movement as disclosed. Preferably, they incorporate flexible high temperature V-shaped seal rings which expand under internal pressure to assure a reliable seal. Furthermore, these swivel joints are designed in streamlined form to avoid stagnation of polymer as the polymer passes through the joints. Stagnation tends to cause degradation in some polymers, especially under the high temperature conditions that necessarily exist.

In the preferred embodiment of the invention selected for illustration in the drawings, the linkages 22 and 23 are infinitely adjusted by a programmed encoder connected to control motorized screw jacks or hydraulic cylinders to appropriate positions, which allow precise predetermined elevations and angles. Since the sheet die and the rolls are operated in very close proximity—usually within less than one-half inch separation at their closest points, precise positioning and maintenance of precise positions is essential to avoid catastrophic damage to the roll surfaces as well as to the sheet die.

Although the drawings show the use of a static mixer which is preferred in order to provide the best possible extrudate quality, a rigid pipe may suffice. Similarly, although the drawings disclose the use of the gear pump 17, which is useful for precision control of the polymer volume flow and which can, when desired, be omitted. It is important, however, to provide a rigid connecting conduit of one kind or another between the spaced-apart swivel connections 22 and 23, since such a conduit is highly instrumental in achieving a variety of changes of positions and angles of the extrusion die 21 relative to the nip of the rolls 27, 27. It will accordingly be appreciated that the gear pump and the static mixer may be simply replaced by a rigid conduit, if desired, in a particular apparatus.

A provision of two sealed swivel connection joints, internally sealed against leakage and against polymer flow stagnation, provides an apparatus which achieves highly important advantages. The cooling rolls can be arranged at an optimum angle of tilt for the particular type, thickness and composition of the extruded or coextruded polymeric sheet under consideration, and may optionally be pressed together under substantial pressure in order to squeeze air out of the space between the sheet and the roll. This not only achieves a precisely controlled surface such as a matte finish, grain finish or polished finish, but provides for uniformity of cooling throughout the entire width of the running polymeric sheet. For different types of sheets, in order to obtain the optimum finish and optimum cooling uniformity, the roll stack may be arranged at a wide variety of different angles to suit the different properties and conditions at hand. The apparatus in accordance with this invention can accordingly be used in a universal matter. Wide ranges of angles are needed for wide ranges of different polymers and different polymer thicknesses. Further, different angles can be used to provide different desired surface characteristics in the product.

For some purposes it is desired to run the polymeric sheet upwardly through the rolls of the stack 24 (upstack) while in other cases it is desirable to run the polymer down through the rolls (downstack). In accordance with this invention, the apparatus can be quickly modified in order to change from an upstack configuration to a downstack configuration, and can also be changed to various degrees of angles of inclination of the roll stack 24. This is a great advantage over the apparatus presently available, in which rigid adapters have been needed and which are difficult and costly to change. It has been thought necessary to utilize rigid adapters because the only flexible hoses known in the art are limited to diameters too small to be practical for the high flow rates that are necessary, and too weak to withstand the necessary pressures and temperatures, or are circumferentially corrugated high pressure metal tubes that cannot be uniformly heated and allow stagnation and degradation of the polymer.

Although this invention has been described with reference to specific embodiments thereof, it will be appreciated that a wide variety of modifications may be made without departing from the spirit and scope of the invention. For example, the invention is applicable to extrusion or coextrusion, and where coextrusion is practiced it is not limited to any particular number or kind of sheets or sheet layers. It is of the essence of this invention that two spaced-apart connecting linkages are provided, with a rigid conduit extending between them, which linkages are free to swivel and may be caused to swivel to independently selected locations and angular positions, all while maintaining in an essentially leakproof manner a hot, pressurized, polymeric material which cannot be allowed to stagnate for fear of polymer degradation. This is admirably achieved by the apparatus in accordance with this invention.

Although particular stacked arrangements of cooling rolls 27, 27 have been shown in the drawings, wherein the axes of the cooling rolls are parallel and in line with each other, other cooling roll configurations may be substituted, as will be readily apparent.

In the preparation of very thin cast sheet it is often advantageous to cast the sheet from the extruder die without applying pressure between rolls. In such a case a single roll may be used and the sheet kept against the roll surface by use of an air knife or electrostatic pinning, for example. The invention may accordingly even be practiced with advantage without the use of a tiltable roll stack, and by feeding the extruded sheet directly to a collecting roll, for example. In such a case longitudinal expansion and contraction of the extruder and its pipes and fittings tend to move the sheet die slit toward and away from the collecting roll; such movement may be compensated for by articulation of the spaced-apart swivels of this invention.

Although the specific form of the invention selected for illustration in the drawings shows the use of two swivels or pivotal connections 22 and 23, it will be understood that still additional pivots may be provided in the linkage between the extruder and the sheet die, each with independent control means and power driving means, for even further precision and adaptability of manipulation of the sheet die.

It will further be appreciated that wide varieties of other modifications may be made with respect to the specific forms of the invention selected for illustration in the drawings, and that this invention is intended to cover any such modifications, substitution of equivalent members, and changes of the sequence of the steps of the method, all without departing from the spirit and scope of the invention as defined in the appended claims.

What is claimed is:

1. In an apparatus for extruding a polymeric sheet and for feeding said sheet to a collecting device, which apparatus comprises an extruder connected to feed polymer through a rigid conduit and to and through a sheet die movably positioned adjacent said collecting device, polymer sheet feed control apparatus comprising: a pair of spaced-apart polymer-sealed swivels positioned in said rigid conduit between said extruder and said sheet die;

one said polymer-sealed swivel being connected to permit independent swinging movement of said sheet die up and down relative to said extruder;

another said polymer-sealed swivel being connected to permit independent tilting movement of said sheet die angularly relative to said rigid conduit, and power means connected for actuating movement of said sheet die relative to said swivels independently upwardly and downwardly and in said tilting movement to conform the height and attitude of the sheet die to the specific height and inclination of the central axis of a roll nip into which said sheet is introduced.

2. The apparatus according to claim 1, wherein one of said swivels is positioned intermediate said extruder and said conduit, and wherein another of said swivels is positioned intermediate said conduit and said sheet die.

3. The apparatus according to claim 1 wherein each said swivel is part of said conduit and wherein separate power means are provided for moving each swivel independently of the movement of the other swivel.

4. The apparatus according to claim 1 wherein a gear pump is positioned in said polymer feed path between said extruder and one of said swivels.

5. The apparatus according to claim 1 wherein a static mixer is positioned in said polymer feed path between said one of said swivels and said die.

6. The apparatus according to claim 1 wherein said power means includes a screw jack.

7. The apparatus according to claim 1 wherein control means is connected to correlate movements of said swivels with each other.

8. The apparatus according to claim 1 wherein said swivels are internally sealed swivel joints which are substantially polymer leakproof at elevated temperatures and pressures necessary for polymeric extrusion.

9. The apparatus according to claim 1 wherein a plurality of said extruders is provided as a coextrusion system, and for introducing a plurality of different polymers into a die of said coextruder.

10. In an apparatus for extruding and cooling a polymeric sheet, which apparatus comprises an extruder connected to feed polymer through a rigid conduit and to and through a sheet die, and comprising a roll stack including a plurality of cooling rolls having nips arranged adjacent said sheet die to continuously receive and cool polymeric sheet emanating from said die, polymeric sheet feed control apparatus comprising:

(a) means for tilting said stack to arrange said roll nips at various angles between and including the vertical and the horizontal, (b) a pair of spaced-apart swivels positioned between said extruder and said sheet die, one said swivel being connected to permit independent swinging movement of said sheet die up and down, and another said swivel being connected to permit independent tilting movement of said sheet die angularly to relate the tilt of said sheet die to the tilt of said stack, and (c) power means connected for actuating movement of said sheet die independently upwardly and downwardly and in said tilting movement.

11. The apparatus according to claim 10 wherein said means (a) for tilting said stack includes power means for tilting said stack while said sheet die is producing sheet.

12. The apparatus according to claim 10 wherein power means are provided for causing tilting movement of said sheet die while said sheet die is producing sheet.

13. In a method of attaining cooling uniformity when using a cooling roll stack nip for continuously cooling a hot continuously extruded polymeric sheet from the outlet of a polymer sheet die, the steps which comprise:

(a) tilting said stack to an optimum nip roll angle for the particular sheet, (b) changing the elevation and angle of tilt of said sheet die to conform to the tilt of said stack, and (c) positioning the outlet of said sheet die immediately adjacent to said nip.

14. The method of claim 13 including the further step of correlating the tilting of said stack to the positioning and angle of said sheet die.

15. The method of claim 13 wherein the step (a) is performed while said sheet die is producing sheet.

16. The method of claim 13 wherein the step (b) is performed while said sheet die is producing sheet.

17. The method of claim 13 wherein the step (c) is performed while said sheet die is producing sheet.

18. In a method of collecting at a fixed location a continuously extruded polymeric sheet from the outlet of a sheet die connected by rigid conduit to receive hot polymer from an extruder, wherein temperature variations tend to cause expansion and contraction of said extruder and said conduit, the steps which comprise compensating for said expansion and contraction by:

(a) swingably adjusting the elevation of said sheet die; and (b) pivotally adjusting the angle of tilt of said sheet die to conform to the position of said collection location.

* * * * *